(12) United States Patent
Nataraj et al.

(10) Patent No.: US 10,616,081 B2
(45) Date of Patent: Apr. 7, 2020

(54) APPLICATION AWARE CLUSTER MONITORING

(71) Applicant: Cisco Technology, Inc., San Jose, CA (US)

(72) Inventors: Harish Nataraj, Berkeley, CA (US); Naveen Kondapalli, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 15/011,105

(22) Filed: Jan. 29, 2016

(65) Prior Publication Data

US 2017/0222897 A1    Aug. 3, 2017

(51) Int. Cl.
*H04L 12/26*    (2006.01)

(52) U.S. Cl.
CPC .............. *H04L 43/08* (2013.01); *H04L 43/06* (2013.01)

(58) Field of Classification Search
CPC ...................................................... H04L 43/08
See application file for complete search history.

(56) References Cited

U.S. PATENT DOCUMENTS

| | | |
|---|---|---|
| 2008/0177874 A1 | 7/2008 | Mullarkey |
| 2008/0263401 A1 | 10/2008 | Stenzel |
| 2013/0054776 A1 | 2/2013 | Kunze et al. |
| 2014/0068003 A1* | 3/2014 | Bansal ................ H04L 41/5038 709/217 |
| 2015/0067146 A1* | 3/2015 | Raker ................. G06F 11/3495 709/224 |
| 2016/0359697 A1* | 12/2016 | Scheib ............... H04L 63/1425 |

OTHER PUBLICATIONS

Li, "Automatic Log Analysis using Machine Learning. Awesome Automatic Log Analysis version 2.0," Department of Information Technology, Uppsala University, Nov. 2013. Retrieved from the Internet: http://uu.diva-portal.org/smash/get/diva2:667650/FULLTEXT01.pdf, pp. 1-50.
International Search Report dated Apr. 8, 2016 in connection with PCT/US2016/015794.

\* cited by examiner

*Primary Examiner* — Nicholas P Celani
(74) *Attorney, Agent, or Firm* — Behmke Innovation Group LLC; James Behmke; Stephen D. LeBarron

(57) ABSTRACT

A cluster analysis feature is provided to monitor and troubleshoot infrastructure issues impacting a distributed business application. Performance trends of one or more tiers of applications may be monitored, analyzed, and reported. By monitoring and reporting performance issues for tiers of applications, valuable time is saved from to individually go through each application individually. Agents installed on individual applications may monitor the performance of applications, collect metrics, aggregate the metrics and report the metrics back to a server. Clustering algorithms may be used to cluster infrastructure metrics and then correlate those metrics with the application nodes using the same algorithms.

14 Claims, 8 Drawing Sheets

US 10,616,081 B2

APPLICATION AWARE CLUSTER MONITORING

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application. When monitoring applications that occur over multiple servers, determining what is happening for a particular application may often be difficult. Something occurring on a different server or different tier of application notes may often affect a remote application. Typically, the only way to detect a cause of such a problem is to review the performance data of each and every application on multiple servers manually. This is a large undertaking that takes a lot of time, and is not very efficient in solving problems. What is needed is an improved method for addressing issues with performance of tiers of applications that might affect individual application performance.

SUMMARY

The present technology provides a cluster analysis feature to monitor and troubleshoot infrastructure issues impacting a distributed business application. Performance trends of one or more tiers of applications may be monitored, analyzed, and reported. By monitoring and reporting performance issues for one or more tiers of applications, valuable time is saved from to individually go through each application individually. Agents installed on individual applications may monitor the performance of applications, collect metrics, aggregate the metrics and report the metrics back to a server. Clustering algorithms may be used to cluster infrastructure metrics and then correlate those metrics with the application nodes using the same algorithms.

Some implementations may include a method for generating cluster data for a tier of servers. A server may generate clusters of tier performance data for a tier. A tier includes a plurality of servers with each server including multiple applications. The server may generate clusters of performance data for each application node in the tier. The clusters of tier performance data and application performance data may be correlated. The correlation of the clusters of tier performance data and application performance data may be reported by the server.

An embodiment may include a system for generating cluster data for tier of servers. The system may include a plurality of machines, with each machine including a processor and memory, and one or more modules stored in memory and executable by the processor. When executed, the modules may generate clusters of tier performance data for a tier, wherein a tier includes a plurality of servers such that each server includes a plurality of applications. The modules may execute to determine clusters of performance data for each application node in the tie and correlate the clusters of tier performance data and application performance data. The modules may further executed to report by the server the correlation of the clusters of tier performance data and application performance data

DETAILED DESCRIPTION

The present technology provides a cluster analysis feature to monitor and troubleshoot infrastructure issues impacting a distributed business application. Performance trends of one or more tiers of applications may be monitored, analyzed, and reported. By monitoring and reporting performance issues for tiers of applications, valuable time is saved from having to individually go through each application. Agents installed on individual applications may monitor the performance of applications, collect metrics, aggregate the metrics and report the metrics back to a server. Clustering algorithms may be used to cluster infrastructure metrics and then correlate the clustered infrastructure metrics with the application nodes using the same algorithms.

Figure 1:
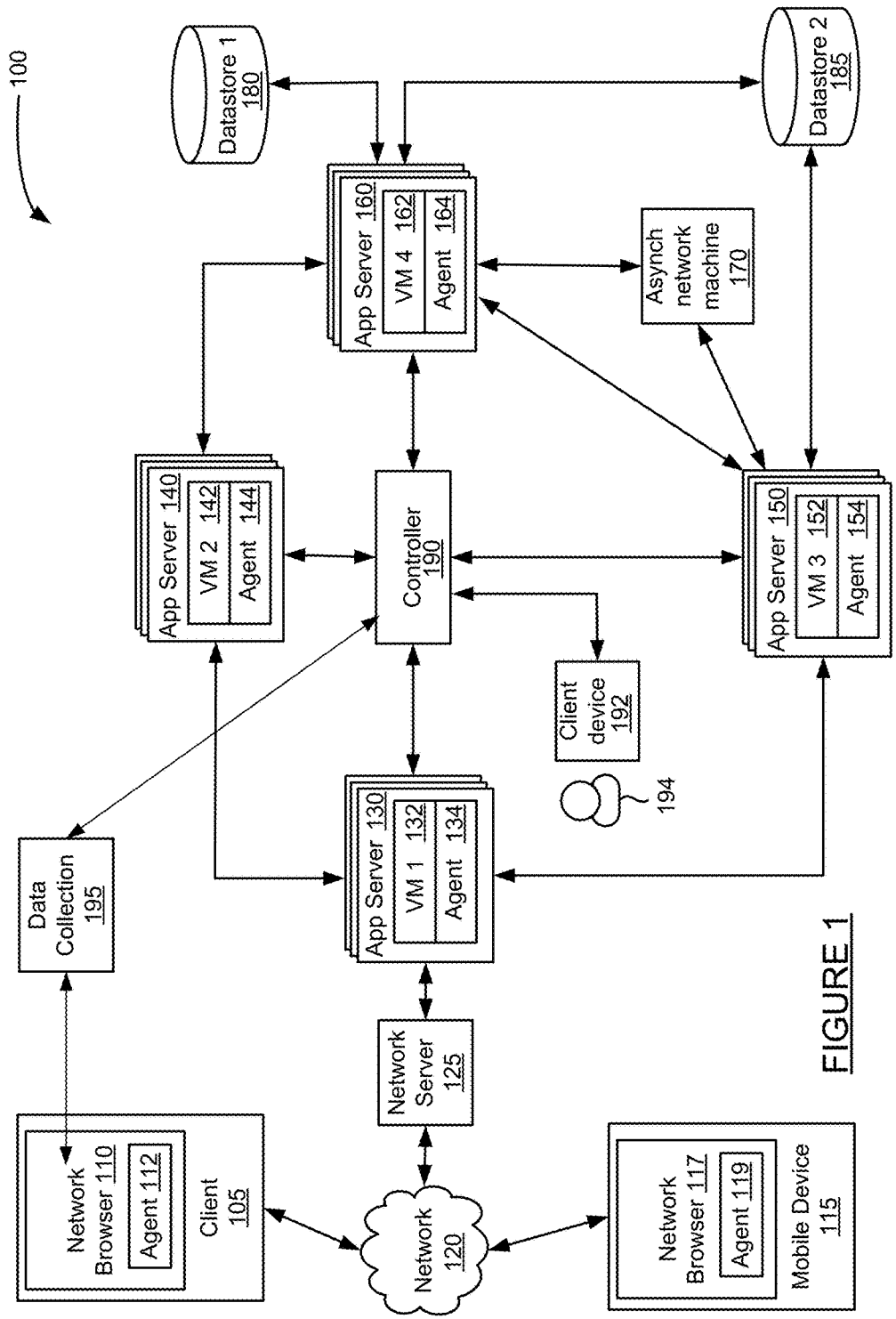
FIG. 1 is a block diagram of an exemplary system monitoring a distributed business transaction

FIG. 1 is a block diagram of an exemplary system for monitoring a distributed business transaction. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request or a network at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Mobile device may also include client applications and other code that may be monitored by agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may report data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120. Network server 125 may be implemented as one or more servers implementing a network service, and may be implemented on the same machine as application server 130 or one or more separate machines. When network 120 is the Internet, network server 125 may be implemented as a web server.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as including a Java, PHP, .Net, and Node.JS, be implemented as a Java virtual machine, or include some other host type. Application server 130 may also include one or more agents 134 (i.e. "modules"), including a language agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the socket and capture packets coming over the socket.

In some embodiments, server 130 may include applications and/or code other than a virtual machine. For example, servers 130, 140, 150, and 160 may each include Java code, .Net code, PHP code, Ruby code, C code, C++ or other binary code to implement applications and process requests received from a remote source. References to a virtual machine with respect to an application server are intended to be for exemplary purposes only.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a or a virtual machine 132 (or other program language, such as a PHP, .Net, or C program), machine resources, network layer data, and communicate with byte instrumented code on application server 130 and one or more applications on application server 130.

Each of agents 134, 144, 154 and 164 may include one or more agents, such as a language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent 220 may collect flow data as well as data associated with the execution of a particular application. The language agent may instrument the lowest level of the application to gather the flow data. The flow data may indicate which tier is communicating with which other tier and on which port. In some instances, the flow data collected from the language agent includes a source IP, a source port, a destination IP, and a destination port. The language agent may report the application data and call chain data to a controller. The language agent may report the collected flow data associated with a particular application to network agent 230.

A network agent may be a standalone agent that resides on the host and collects network flow group data. The network flow group data may include a source IP, destination port, destination IP, and protocol information for network flow received by an application on which network agent 230 is installed. The network agent 230 may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the rolled up metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data and metrics that they respectively collect and aggregate to the controller. Controller 210 may be implemented as a remote server that communicates with agents located on one or more servers or machines. The controller may receive metrics aggregated by the language agent, network agent, and machine agent, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application no. U.S. patent application Ser. No. 12/878,919, titled "Monitoring Distributed Web Application Transactions," filed on Sep. 9, 2010, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular each application may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as a content page, e.g., a web page, which may be provided to and rendered through a network browser application on client device 192.

Applications 132, 142, 152 and 162 may be any of several types of applications. Examples of applications that may implement applications 132-162 include a Java, PHP, .Net, Node.JS, and other applications.

Figure 2:
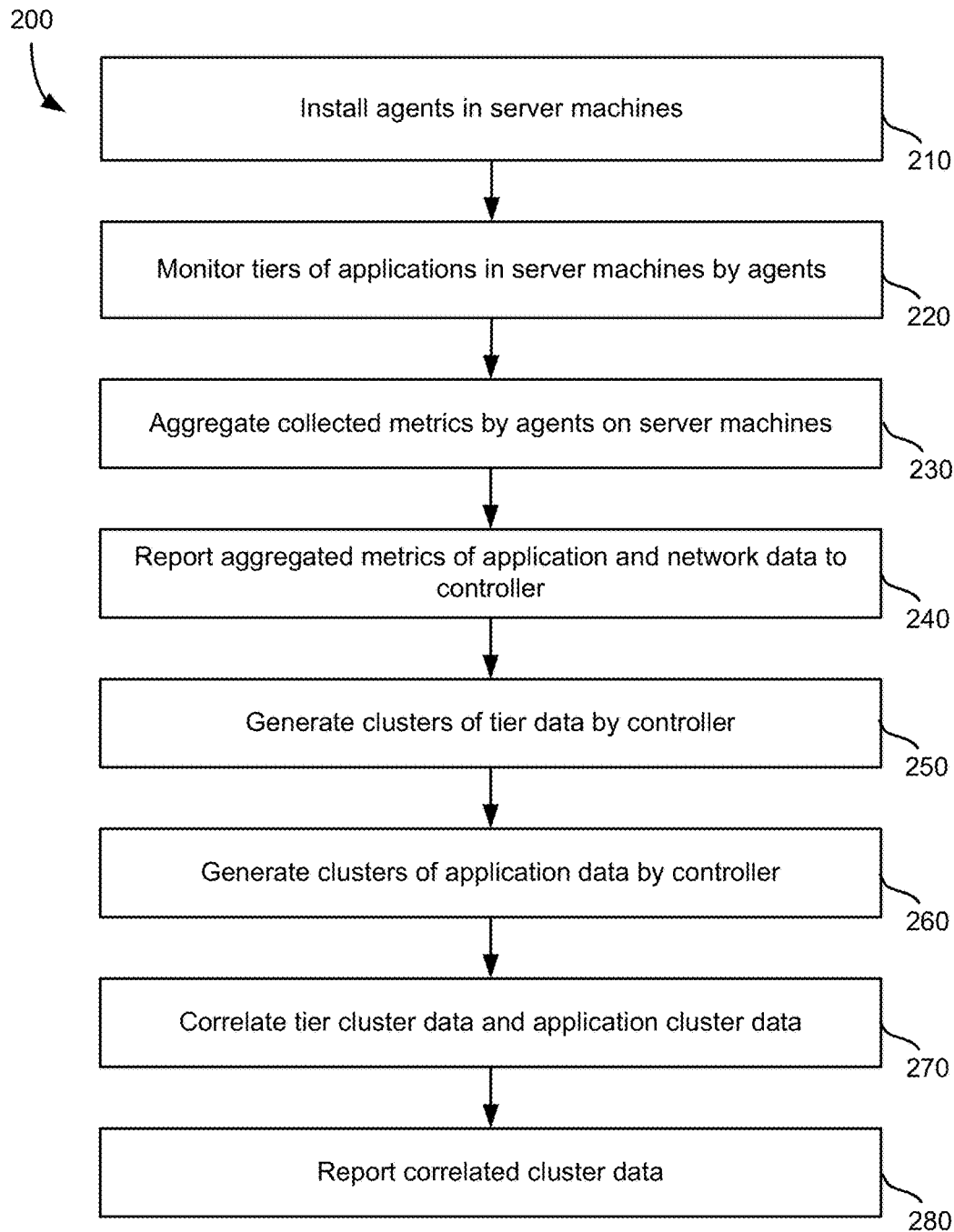
FIG. 2 is an exemplary method correlating tier cluster data and application cluster data.

2 is an exemplary method of correlating tier cluster data and application cluster data. The method in FIG. 2 includes installing agents in server machines at step 210. The agents may include network agents, language agents, and machine agents. The agents may be installed within each server, and may include multiple agents per server. As such, an agent may monitor one or more applications hosted on a particular server. Tiers of applications are monitored on server machines by the installed agents at step 220. A tier may be a collection of applications on one or more servers that perform a similar function. For example, a tier of nodes may handle a "check out" service provided by an e-commerce web site. Collected data may then be aggregated into metrics by agents on the server machines at step 230. Aggregating the collected metrics may include rolling up the metrics, such as average response time, maximum response time, minimum response time, as well as infrastructure metrics such as average CPU usage and average memory usage.

The aggregated metrics maybe reported to a controller at step 240. The aggregated metrics may include metrics for both an application and network data, as well as the machine on which the application executes.

Clusters of tier data may be generated by a controller at step 250. Generating clusters of tier data may include applying a clustering algorithm to the aggregated tier metrics. More detail for generating clusters of two data by controller is discussed with respect to the method of FIG. 3.

Clusters of application data are generated by controller at step 260. Generating clusters application data may also be performed by applying a clustering algorithm to the application metrics. More detail for generating clusters of application data is discussed with respect to the method of FIG. 4.

After clusters are generated for tiers of applications and the application data, the tier cluster data and application cluster data may be correlated at step 270. In some instances, a tier of nodes may be correlated with a particular application cluster simply by including a list of the applications included within the tier. In some instances, the tier data and individual application data may be correlated with a distributed business transaction using a sequence of identifiers that identifies servers used to process the particular distributed business transaction. The correlation may be stored by controller 190 locally, or on data store 180 or 185.

Correlated cluster data may be reported at step 280. Correlated cluster data may be reported for a cluster of nodes, applications correlated with the cluster of nodes, in the same interface or separate interfaces. The reporting may be performed using a heat map, bar graphs, or some other reporting method. More detail for reporting correlated cluster data is discussed respect to the method of FIG. 5.

Figure 3:
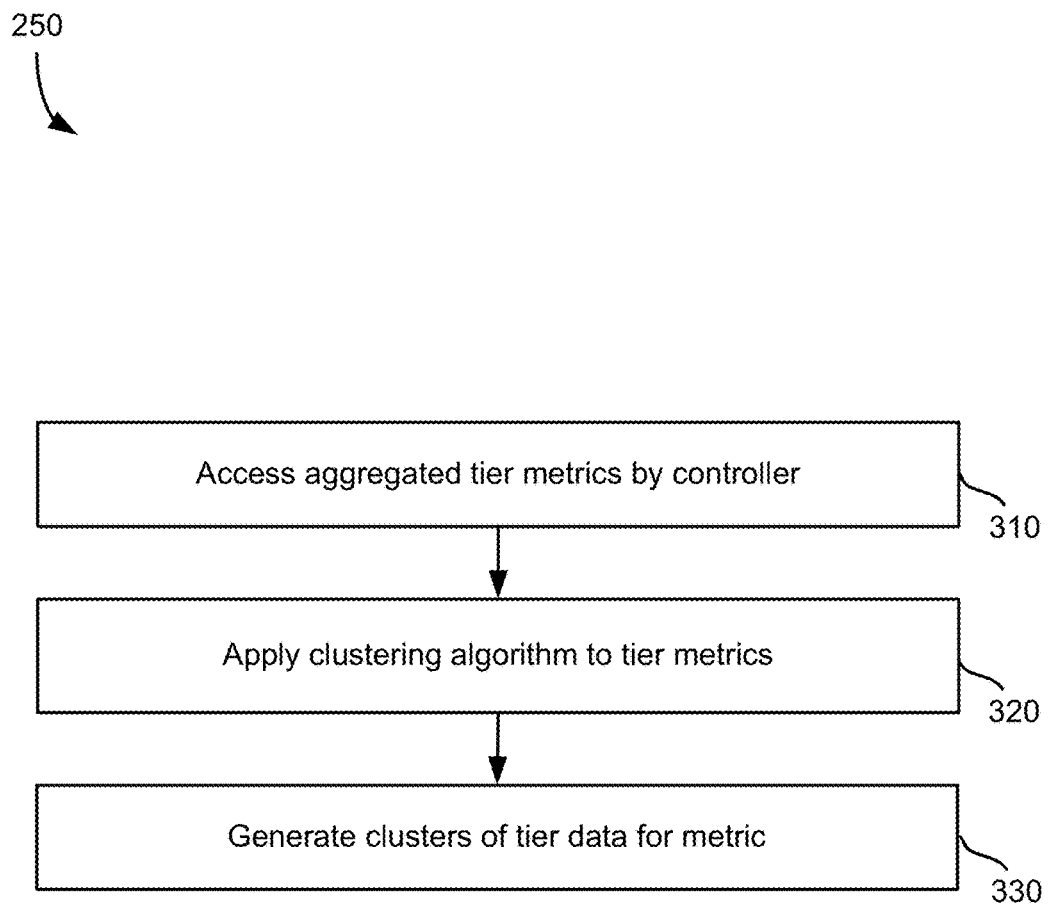
FIG. 3 is an exemplary method for generating clusters of two data by controller.

FIG. 3 illustrates an exemplary method for generating clusters of tier data by a controller. The method of FIG. 3 provides more detail for step 250 of the method FIG. 2. The aggregated tier metrics are accessed by controller at step 310. The aggregated tier metrics are those reported by agents installed on servers that form the tier, and may include for example server CPU usage, server memory usage, other infrastructure metrics for all servers making up a tier, and other metrics.

A clustering algorithm may be applied to the tier metrics at step 320. The clustering algorithm may receive an input of the metric values and output one or more bands representing clusters of metrics. The clustering algorithm may be a scientific machine learning algorithm such as a density based spatial clustering of applications with noise (DB-SCAN) or a k-means algorithm. The algorithm may be used for clustering infrastructure metrics for a particular tier. The algorithm may output clusters of tier data for the particular metric at step 330. For example, for a metric of CPU usage for one hundred servers in a tier, the output may show a first band that 50% of the CPU usage for the tier is used by 15 servers, 40% is used by the next 80 servers, and 10% is used by 10 servers, representing three bands or clusters output by the clustering algorithm.

Figure 4:
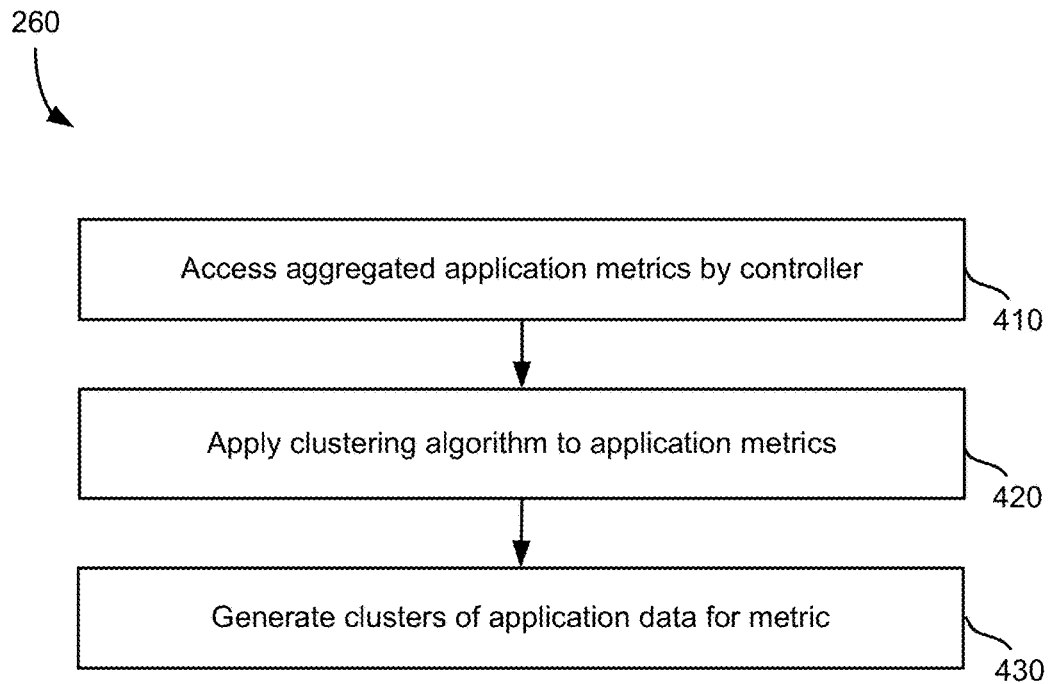
FIG. 4 is an exemplary method for generating clusters of application data by controller.

FIG. 4 is an exemplary method for generating clusters of application data by controller. The method of FIG. 4 may provide more detail for step 260 of the method of FIG. 3. First, aggregated application metrics are accessed by controller at step 410. The controller may then apply the clustering algorithm to application metrics at step 420. As with tier data, the controller may apply a DBSCAN or k-means algorithm, or any suitable scientific machine learning algorithm, to the application metrics at step 420. Clusters of application data are then generated for the application metrics at step 430.

Figure 5:
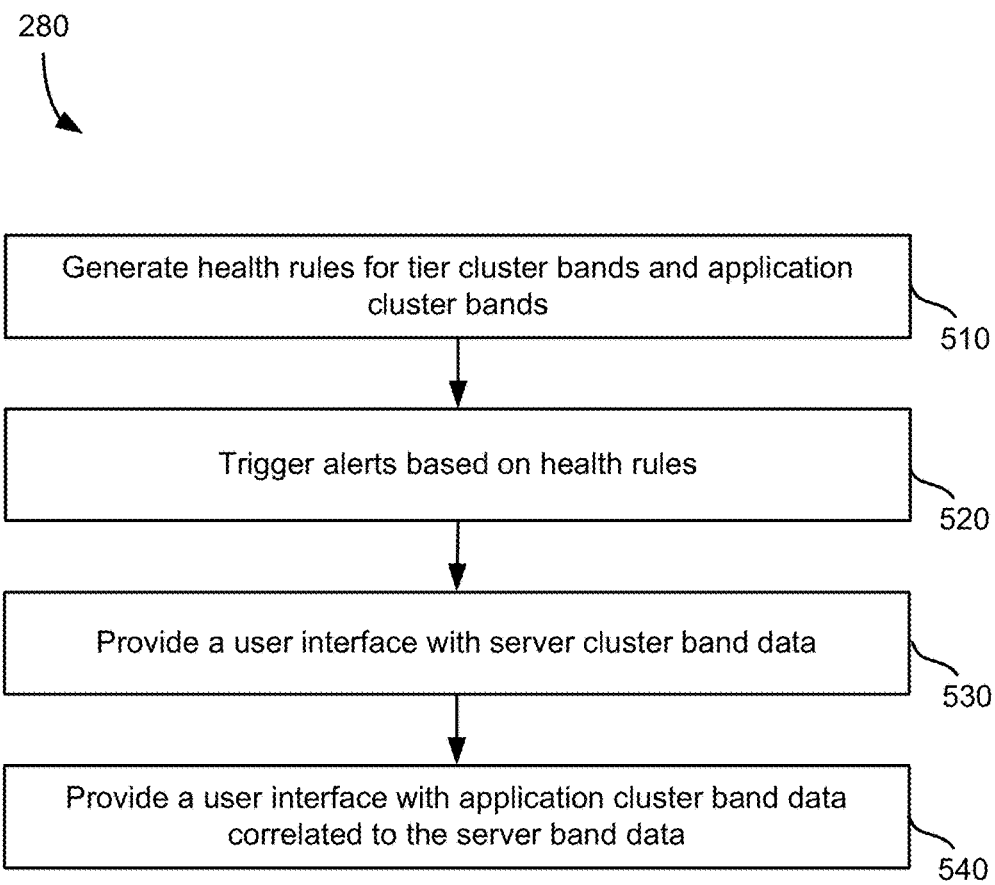
FIG. 5 is an exemplary method for reporting correlated cluster data.

FIG. 5 is an exemplary method for reporting correlated cluster data. The method of FIG. 5 provides more detail for step 280 of the method FIG. 2. First, health rules may be generated for tier cluster bands an application cluster bands at step 510. Health rules may specify a threshold associated with a particular cluster size or number of clusters generated by a cluster algorithm. When the number of clusters or a cluster size exceeds the specified threshold value, an action may be taken. Such action may include triggering an alert based on the health rule at step 520. An alert may be triggered when a threshold is exceeded, resulting in an email notification, text message, or some other action taken based on an exceeded threshold.

Figure 6:
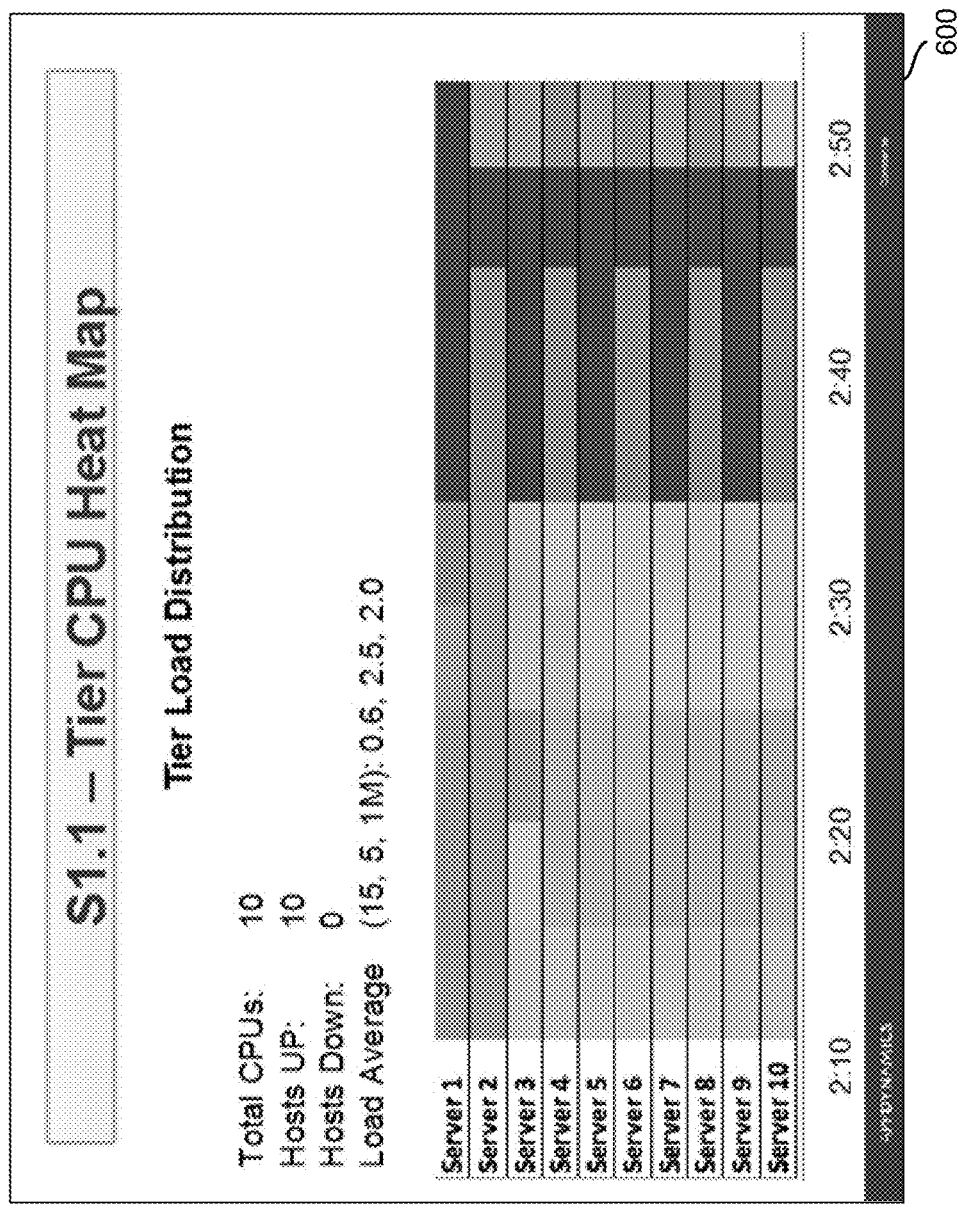
FIG. 6 is an exemplary interface for reporting server cluster data.
Figure 7:
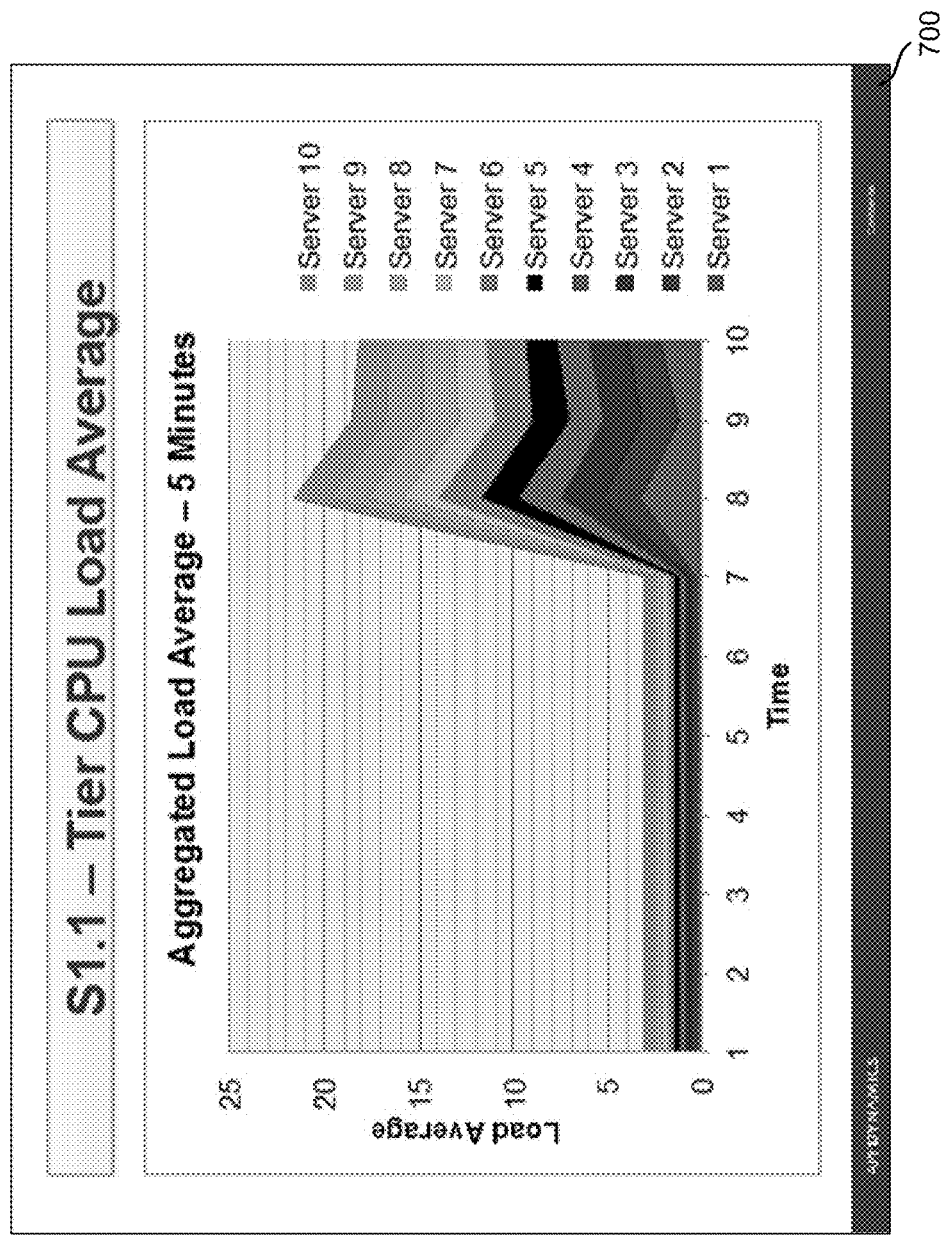
FIG. 7 is another exemplary interface for reporting server cluster data

A user interface with server cluster data may be provided at step 530. Each of FIGS. 6-7 illustrate an exemplary interface with server cluster data. FIG. 6 illustrates a tier CPU heat map which provides tier load distribution data. In the example shown in FIG. 6, for each of multiple servers (e.g., 10 servers shown for illustrative purpose), over a period of time, the relative CPU load for each server is illustrated. At a particular time, each of the servers within the particular node experienced an increase in CPU load, as shown at time 2:35 along the horizontal axis. In FIG. 7, the tier CPU load increased for each server in the tier at a time of about seven along the horizontal axis.

Figure 8:
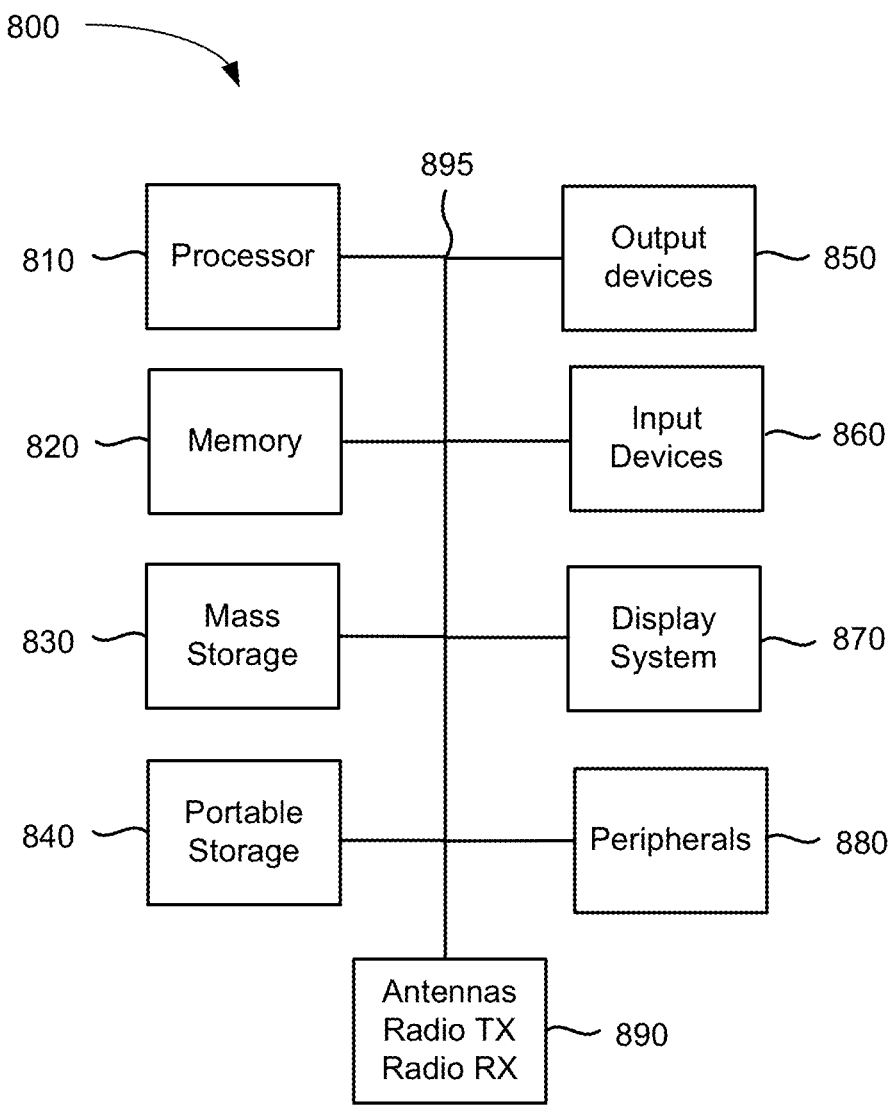
FIG. 8 is a block diagram of an exemplary computing environment for use with the present technology.

A user interface with application cluster bands correlated to the server band may be provided at step 540. An interface with application cluster bands associated with application metrics may be viewed over similar time frames and illustrated for the server data. As a result, when application metrics for a tier of servers is seen to trend a particular way the particular time, the corresponding application executed on a server within the tier may also be analyzed to determine whether the tier issue affected the application performance FIG. 8 is a block diagram of an exemplary system for implementing the present technology. System 800 of FIG. 8 may be implemented in the contexts of the likes of client computers 105, 192, mobile device 115, servers 125, 130, 140, 150, 160, machine 170, data stores 180 and 190, and controller 190. The computing system 800 of FIG. 8 includes one or more processors 810 and memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive, an optical disk drive, a flash drive, or other device, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a floppy disk, compact disk or Digital video disc, USB drive, memory card or stick, or other portable or removable memory, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device. Display system 870 may also receive input as a touch-screen.

Peripherals 880 may include any type of computer support device to add additional functionality to the computer system. For example, peripheral device(s) 880 may include a modem or a router, printer, and other device.

The system of 800 may also include, in some implementations, antennas, radio transmitters and radio receivers 890. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, iOS, Android, C, C++, Node.JS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for generating clusters of tier performance data for a tier of servers, comprising:
    receiving, at a remote server, aggregated tier metrics from a plurality of agents on one or more tier servers forming the tier of servers, the tier of servers including a plurality of servers wherein each server in the plurality of servers includes one or more applications that perform a function associated with a distributed business transaction, and the aggregated tier metrics comprising infrastructure metrics of the plurality of servers, wherein the remote server identifies the tier metrics as associated with the distributed business transaction using a request identifier that identifies the plurality of servers used to perform the function associated with the distributed business transaction;
    based on the aggregated tier metrics, generating, by a machine learning clustering algorithm executing on the remote server, the clusters of tier performance data for the tier of servers, wherein each cluster is associated with a particular metric;
    receiving, from the plurality of agents, application metrics associated with performance of the one or more applications, wherein the remote server identifies the application metrics as associated with the distributed business transaction by using the request identifier;
    based on the application metrics, generating, by the machine learning clustering algorithm executing on the remote server, clusters of application data for each application in the one or more applications;
    generating at least one health rule based on the clusters of tier performance data, wherein the at least one health rule specifies a threshold associated with a particular cluster size or number of clusters generated by the machine learning clustering algorithm;
    correlating, by the remote server, the clusters of tier performance data and the clusters of application data for each application to generate correlation results by using the request identifier; and
    in response to the clusters of tier performance data exceeding the threshold associated with the particular cluster size or number of clusters, reporting, by the remote server, the correlation results to a user interface.

2. The method of claim 1, wherein the machine learning clustering algorithm includes a density-based spatial clustering of applications with noise algorithm.

3. The method of claim 1, wherein the clusters of tier performance data are generated based on a metric for each server in the plurality of servers.

4. The method of claim 3, wherein the metric includes CPU usage or memory usage.

5. The method of claim 1, wherein the request identifier includes a tier identifier and an application identifier.

6. The method of claim 1, further comprising generating an alert if a value for a cluster of the clusters of tier performance data exceeds a threshold.

7. The method of claim 1, further comprising reporting by the remote server the correlation of the clusters of tier performance data and performance data for a selected application of the one or more applications within a first server of the plurality of servers.

8. A non-transitory computer readable storage medium having embodied thereon a program, the program being executable by a processor to perform a method for generating clusters of tier performance data for a tier of servers, the method comprising:
    receiving, at a remote server, aggregated tier metrics from a plurality of agents on one or more tier servers forming the tier of servers, the tier of servers including a plurality of servers wherein each server in the plurality of servers includes one or more applications that perform a function associated with a distributed business transaction, and the aggregated metrics comprising infrastructure metrics of the plurality of servers, wherein the remote server identifies the tier metrics as associated with the distributed business transaction using a request identifier that identifies the plurality of servers used to perform the function associated with the distributed business transaction;
    based on the aggregated tier metrics, generating, by a machine learning clustering algorithm executing on the remote server, the clusters of tier performance data for the tier of servers, wherein each cluster is associated with a particular metric;
    receiving, from the plurality of agents, application metrics associated with performance of the one or more applications, wherein the remote server identifies the application metrics as associated with the distributed business transaction by using the request identifier;
    based on the application metrics, generating, by the machine learning clustering algorithm executing on the remote server, clusters of application data for each application in the one or more applications;

generating at least one health rule based on the clusters of tier performance data, wherein the at least one health rule specifies a threshold associated with a particular cluster size or number of clusters generated by the machine learning clustering algorithm;

correlating, by the remote server, the clusters of tier performance data and the clusters of application data for each application to generate correlation results by using the request identifier; and in response to the clusters of tier performance data exceeding the threshold associated with the particular cluster size or number of clusters, reporting, by the remote server, the correlation results to a user interface.

9. The non-transitory computer readable storage medium of claim 8, wherein the machine learning clustering algorithm includes a density-based spatial clustering of applications with noise algorithm.

10. The non-transitory computer readable storage medium of claim 8, wherein the clusters of tier performance data are generated based on a metric for each server in the plurality of servers.

11. The non-transitory computer readable storage medium of claim 10, wherein the metric includes CPU usage or memory usage.

12. The non-transitory computer readable storage medium of claim 8, wherein the request identifier includes a tier identifier and an application identifier.

13. The non-transitory computer readable storage medium of claim 8, further comprising generating an alert if a value for a cluster of the clusters of tier performance data a threshold.

14. The non-transitory computer readable storage medium of claim 8, further comprising reporting by the remote server the correlation of the clusters of tier performance data and performance data for a selected application of the one or more applications within a first server of the plurality of servers.

* * * * *